United States Patent
Morimoto et al.

(10) Patent No.: US 7,250,384 B2
(45) Date of Patent: Jul. 31, 2007

(54) METHOD FOR PRODUCING CORDIERITE-BASED POROUS MATERIAL

(75) Inventors: Kenji Morimoto, Kasugai (JP); Katsuhiro Inoue, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 7 days.

(21) Appl. No.: 10/509,155

(22) PCT Filed: Mar. 27, 2003

(86) PCT No.: PCT/JP03/03860

§ 371 (c)(1),
(2), (4) Date: Nov. 17, 2004

(87) PCT Pub. No.: WO03/082772

PCT Pub. Date: Oct. 9, 2003

(65) Prior Publication Data

US 2005/0101479 A1   May 12, 2005

(30) Foreign Application Priority Data

Mar. 29, 2002 (JP) ............................. 2002-094113

(51) Int. Cl.
*C04B 35/195* (2006.01)
*B01J 21/08* (2006.01)

(52) U.S. Cl. ...................... 501/119; 501/128; 264/631; 502/263; 502/407; 502/439

(58) Field of Classification Search ................ 501/119, 501/128; 502/407, 263, 439; 264/631
See application file for complete search history.

(56) References Cited

U.S. PATENT DOCUMENTS

| | | | | |
|---|---|---|---|---|
| 4,698,317 A | * | 10/1987 | Inoue et al. | 501/9 |
| 4,871,693 A | * | 10/1989 | Inoue et al. | 501/9 |
| 5,167,885 A | * | 12/1992 | Rice et al. | 264/603 |
| 6,254,963 B1 | | 7/2001 | Kondo | 428/116 |

FOREIGN PATENT DOCUMENTS

| | | | |
|---|---|---|---|
| JP | 03-284313 | | 12/1991 |
| JP | 06-116059 | | 4/1994 |
| JP | 07-163823 | | 6/1995 |
| JP | 09-077573 | | 3/1997 |
| JP | 11-333293 | | 12/1999 |
| JP | 2001-261463 | | 9/2001 |
| JP | 2002326881 | * | 11/2002 |

OTHER PUBLICATIONS

Machine translation of japanese document 2002-326881, Dec. 11, 2002.*

* cited by examiner

*Primary Examiner*—Karl Group
(74) *Attorney, Agent, or Firm*—Steptoe & Johnson LLP

(57) ABSTRACT

A method of manufacturing a cordierite porous body of the present invention is a method of manufacturing the cordierite porous body using a cordierite forming material including an Al source, an Si source, and an Mg source and forming cordierite by firing, characterized in that an inorganic micro balloon containing $SiO_2$ and $Al_2O_3$ is used as a part or all of the Al source and the Si source, so that a high-open-porosity cordierite porous body having an extremely low possibility of generating defects causing leakage of a fluid, such as cuts can be manufactured.

10 Claims, 1 Drawing Sheet

METHOD FOR PRODUCING CORDIERITE-BASED POROUS MATERIAL

TECHNICAL FIELD

The present invention relates to a method of manufacturing a cordierite porous body having characteristics which are preferable for a material constituting a filter, a catalyst carrier or the like mainly for purifying automobile exhaust gas.

BACKGROUND ART

In recent years, a diesel particulate filter (DPF) which traps particulates discharged from a diesel engine has attract attention, and there has been a demand for a DPF capable of obtaining a high trapping efficiency with a low pressure loss. As the DPF, a honeycomb structure formed of cordierite has heretofore been used, and a porosity, pore distribution and the like of the honeycomb structure have heretofore been improved in order to obtain the above-described high trapping efficiency with the low pressure loss.

As conventional techniques, a honeycomb structure whose porosity and average pore diameter are increased and whose pore distribution in a partition wall surface is defined, and a honeycomb structure whose partition wall thickness is set to be not more than a predetermined thickness and whose porosity is increased have been described (see Patent Documents 1, 2).

Moreover, as another conventional technique, manufacturing of a high-porosity honeycomb structure by use of particles coarser than predetermined as particles of both talc and silica components in a cordierite forming material, and a honeycomb structure whose porosity is increased and whose pore distribution and surface roughness are defined have been described (see Patent Documents 3, 4). It is to be noted that in these conventional techniques, to raise the porosity, the cordierite forming material is formed into coarse and large particles, and graphite, wood powder, foaming agent or the like is added as a pore former.

However, when the cordierite forming material is formed into the coarse and large particles, a cordierite forming reaction does not sufficiently proceed, and it has been difficult to achieve a low coefficient of thermal expansion. In a case where graphite is used as the pore former, permittivity of a formed body to which graphite has been added drops. When the added amount increases, it is difficult to uniformly perform drying by dielectric drying or microwave drying. Further in a firing step, a firing time is lengthened at 800 to 1000° C., and therefore there has been a problem that rapid burning of graphite needs to be inhibited.

Moreover, when starches and wood powders are used as the pore formers, a large amount of water needs to be added in order to form a clay into a predetermined hardness in a kneading step, and there has been a problem that an efficiency of a drying step is degraded. Further in a firing step, the starches and wood powders cause rapid burning and generate heat at 200 to 400° C., and it has been difficult to prevent firing cracks from being caused by this step. In this manner, in the conventional techniques, it has been remarkably difficult to increase an open porosity to be not less than a predetermined porosity.

Moreover, to obtain a higher open porosity, for example, an open porosity of 60% or more, a large amount of pore formers need to be also added. When a large amount of organic compound based pore formers are added in this manner, amounts of an organic volatile substance, and a gas such as carbon dioxide generated in a degreasing (calcining) stage also increase, and a burning heat also increases. Therefore, defective portions such as cracks, tears and cuts, that is, defective places which do not exert any filter function and in which leakage of a fluid occurs are formed in an obtained calcined (degreased) body or fired body in some case.

(Patent Document 1)
  Japanese Patent Application Laid-Open No. 9-77573

(Patent Document 2)
  Japanese Patent Application Laid-Open No. 11-333293

(Patent Document 3)
  Japanese Patent Publication No. 7-38930

(Patent Document 4)
  Japanese Patent No. 2726616

The present invention has been developed in consideration of these problems of the conventional techniques, and an object thereof is to provide a method of manufacturing a cordierite porous body having a high open porosity, in which there is an extremely low possibility of generating defects causing leakage of a fluid, such as cuts.

DISCLOSURE OF THE INVENTION

That is, according to the present invention, there is provided a method of manufacturing a cordierite porous body using a cordierite forming material including an Al source, an Si source, and an Mg source and forming cordierite by firing, wherein an inorganic micro balloon containing $SiO_2$ and $Al_2O_3$ is used as a part or all of the Al source and the Si source.

In the present invention, a crush strength of the inorganic micro balloon, measured by a micro compression tester, is preferably 1 MPa or more, and a moisture content of the inorganic micro balloon is preferably 0.1% by mass or less. In the present invention, the inorganic micro balloon is preferably obtained by calcining at 300° C. or more.

In the present invention, a total content of the Si source and the Al source included in the inorganic micro balloon with respect to the whole inorganic micro balloon is preferably 90% by mass or more, when the Si source is converted to $SiO_2$, and the Al source is converted to $Al_2O_3$. A total content of a sodium compound and a potassium compound included in the inorganic micro balloon with the whole inorganic micro balloon is preferably 0.2 to 2% by mass, when the sodium compound is converted to $Na_2O$, and the potassium compound is converted to $K_2O$.

Moreover, in the present invention, a melting point of the inorganic micro balloon is 1400 to 1650° C., and a tap density of the inorganic micro balloon is preferably 0.5 g/cm³ or less. In the present invention, talc is preferably used as a part or all of the Mg source.

In the present invention, when the inorganic micro balloon is used as a part of the Al source, aluminum hydroxide ($Al(OH)_3$) is preferably used as a part or all of the Al source except the inorganic micro balloon.

In the present invention, when the inorganic micro balloon is used as a part of the Al source, 20 to 52% by mass of kaolin with respect to an amount of the inorganic micro balloon is preferably used as a part or all of the Al source except the inorganic micro balloon.

BEST MODE FOR CARRYING OUT THE INVENTION

Figure 1:
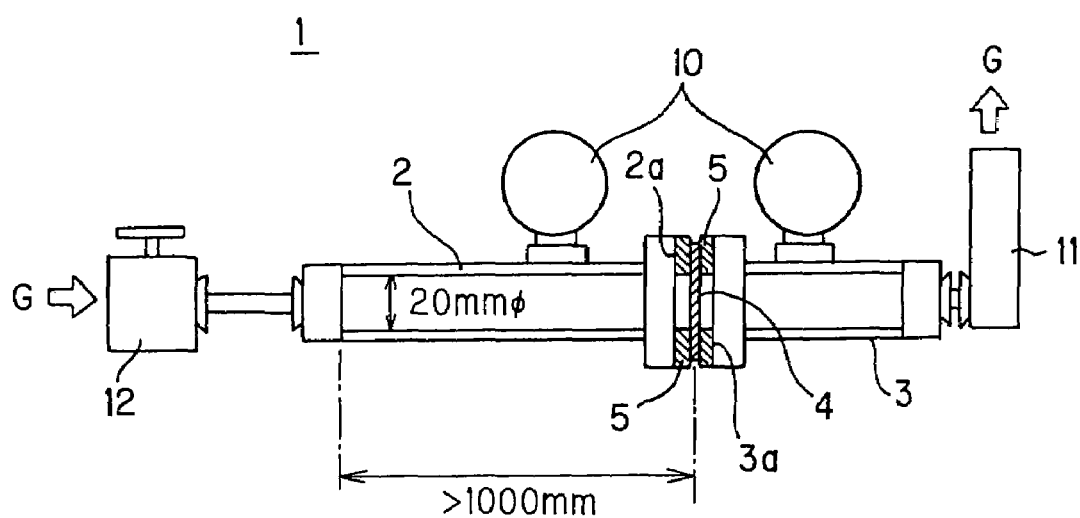
FIG. 1 is a schematic diagram showing an outline of a gas transport characteristic measuring apparatus for use in measuring a gas transport coefficient.

An embodiment of the present invention will be described hereinafter, but it should be understood that the present invention is not limited to the following embodiment, and modifications, improvements and the like of designs are appropriately added based on usual knowledge of a person skilled in the art without departing from the scope of the present invention.

In the present invention, there is provided a method of manufacturing a cordierite porous body using a cordierite forming material including an Al source, an Si source, and an Mg source and forming cordierite by firing, wherein an inorganic micro balloon containing $SiO_2$ and $Al_2O_3$ is used as a part or all of the Al source and the Si source. Details will be described hereinafter.

In the present invention, the inorganic micro balloon for use as a part or all of the Al source and the Si source exhibit a function as a pore former. The inorganic micro balloon has a low specific weight and an appropriate strength as compared with an organic compound based pore former which has heretofore been used, and therefore is not easily crushed at a mixing/kneading time, and easily handled. The inorganic micro balloon exerts a function of an aggregate which appropriately holds a structure of a formed body before firing, and shrinkage of the formed body during the firing can be suppressed. Furthermore, the inorganic micro balloon is fired to thereby react with the Mg source and the like included in the cordierite forming material, and forms cordierite. That is, since the bubbles of the inorganic micro balloon form a porous structure, a superior pore forming effect is exerted, and the cordierite porous body having a high open porosity can be manufactured.

In the present invention, a moisture content of the inorganic micro balloon is preferably 0.1% by mass or less, further preferably 0.08% by mass or less. When the inorganic micro balloon having a moisture content exceeding 0.1% by mass is used, the balloon is ruptured by volume expansion at the firing time, and defects are sometimes generated in the obtained cordierite porous body. When the cordierite porous body is used as a filter, there is unfavorably a possibility that the trapping efficiency drops. It is to be noted that in the present invention a lower limit of the moisture content is not especially limited, and is preferably as low as possible. When the content is substantially 0.1% by mass or less, a defect influencing a soot trapping efficiency is not generated in the obtained cordierite porous body.

Since a method of manufacturing the inorganic micro balloons including fly ash balloons usually includes a water elutriation step, moisture sometimes remains in micro pores. Therefore, to reduce a remaining moisture amount, in the present invention, an inorganic micro balloon calcined at 300° C. or more is preferably used, and an inorganic micro balloon calcined at 320° C. or more is further preferably used.

In the present invention, a total content of the Si and Al sources included in the inorganic micro balloon with respect to the whole inorganic micro balloon is preferably 90% by mass or more, further preferably 95% by mass or more, especially preferably 98% by mass or more, when the Si source is converted to $SiO_2$, and the Al source is converted to $Al_2O_3$. When the total content of the Si and Al sources is less than 90% by mass, a glass phase is produced, and the balloon is unfavorably easily softened at a lower temperature. It is to be noted that an upper limit of the content is not especially limited, and theoretically a higher content is preferable.

In the present invention, a total content of a sodium compound and a potassium compound included in the inorganic micro balloon with the whole inorganic micro balloon is preferably 0.2 to 2% by mass, further preferably 0.2 to 1.5% by mass, especially preferably 0.5 to 1% by mass, when the sodium compound is converted to $Na_2O$, and the potassium compound is converted to $K_2O$. The sodium and potassium compounds contained in the inorganic micro balloon are so-called impurities as viewed from the Si and Al sources ($SiO_2$ and $Al_2O_3$) similarly contained in the balloon, and therefore the inorganic micro balloon containing large amounts of these compounds has a low melting point. That is, in the case of use of the inorganic micro balloon (e.g., Shirasu-balloon, etc.) in which the total content of the sodium and potassium compounds contained as the impurities when converted to $Na_2O$ and $K_2O$, respectively, exceeds 2% by mass, when the firing is performed at around 1420° C., the balloon is quickly and easily molten, the obtained porous body shrinks, and unfavorably the pore forming effect is not exerted well. On the other hand, when the content is less than 0.2% by mass, a shell of the inorganic micro balloon does not open at the firing time, and unfavorably sometimes remains as a closed pore.

In the present invention, a melting point of the inorganic micro balloon is 1400 or more, further preferably 1450° C. or more, and especially preferably 1500° C. or more. When the melting point of the inorganic micro balloon is less than 1400° C., for example, in the case of the firing at around 1420° C., the balloon is quickly and easily molten, the obtained porous body shrinks, and unfavorably the pore forming effect is not exerted well. It is to be noted that an upper limit value of the melting point of the inorganic micro balloon for use in the present invention is preferably 1650° C. or less from viewpoints that the balloon effectively functions as the aggregate and the high-open-porosity porous body is formed. When the melting point of the inorganic micro balloon exceeds 1650° C., the shell of the inorganic micro balloon does not open at the firing time, and favorably sometimes remains as the closed pore. Concrete examples of the inorganic micro balloon which is preferably used in the present invention and which satisfies the above-described various conditions include fly ash balloons (coal ashes) generated as wastes in a thermal power station or the like. It is to be noted that the fly ash balloon is also preferable in that the wastes can be effectively utilized.

In the present invention, the average particle diameter of the inorganic micro balloon is preferably 100 μm or less, because a honeycomb having a partition wall thickness of 300 μm or less can be extruded. The average particle diameter is a value measured by a laser scattering type grain size distribution measuring instrument. A crush strength of the inorganic micro balloon for use in the present invention, measured by a micro compression tester, is preferably 1 MPa or more, because the balloon is not easily crushed at a kneading time. The strength is further preferably 5 MPa or more. The crush strength is a value measured using the micro compression tester, and indicates a value calculated assuming that the inorganic micro balloon is solid sphere. Furthermore, a tap density of the inorganic micro balloon is preferably 0.5 g/cm$^3$ or less, further preferably 0.41 g/cm$^3$ or less. A thickness of the shell of the inorganic micro balloon is preferably 10 μm or less, further preferably 5 μm or less. It is to be noted that the thickness of the shell is a value measured by observation of a broken or polished face of the shell with a microscope. Concrete examples of the inorganic micro balloon satisfying these conditions include E-SPHERES SL-75 (manufactured by ENVIROSPHERES Co.), but the present invention is not limited to these concrete examples.

In the present invention, talc is preferably used as a part or whole of the Mg source included in the cordierite forming material. By the use of talc whose crystal configuration is a plate shape, talc is oriented in the formed body, and formability can be satisfactory. This is also preferable in that substance movement is promoted involving removing of crystal water and phase transition in the process of the firing and a cordierite forming reaction is quickly caused. It is to be noted that talc for use may contain a trace amount of impurities such as $Fe_2O_3$, $CaO$, $Na_2O$, and $K_2O$ in a range which does not substantially influence the melting point of the inorganic micro balloon. Compounds other than talc, such as $Mg(OH)_2$ and $MgCO_3$ may be used as the Mg source as long as the effect by the use of talc is not impaired.

In the present invention, as to a predetermined component source in the cordierite forming material, there is not especially any limitation except that a specific inorganic micro balloon is used. Details of a method of manufacturing the cordierite porous body of the present invention will be described in accordance with an example of a manufacturing process.

First, with respect to 100 parts by mass of the above-described cordierite forming material including the inorganic micro balloon containing $SiO_2$ and $Al_2O_3$ at the predetermined ratio, 0.5 to 2 parts by mass of a dispersant, 10 to 40 parts by mass of water, and 3 to 5 parts by mass of a binder if necessary are projected, and thereafter kneaded to obtain a plastic clay. Here, the inorganic micro balloon is used as the Al and Si sources, but other materials may be added as the Al source and/or the Si source.

Examples of the Al source for use except the inorganic micro balloon include the source containing one or both of aluminum oxide ($Al_2O_3$) and aluminum hydroxide ($Al(OH)_3$) in that impurities are few, but the use of aluminum hydroxide ($Al(OH)_3$) is preferably used because a coefficient of thermal expansion of the obtained cordierite porous body can be reduced.

Furthermore, as the Al source for use except the inorganic micro balloon, 20 to 52% by mass of kaolin with respect to the amount of the inorganic micro balloon is preferably used, and accordingly the coefficient of thermal expansion of the obtained cordierite porous body can be preferably reduced.

Moreover, examples of the binder include hydroxypropyl methyl cellulose, methyl cellulose, hydroxyethyl cellulose, carboxyl methyl cellulose, polyvinyl alcohol and the like. Examples of the dispersant include ethylene glycol, dextrin, fatty acid soap, polyalcohol and the like. It is to be noted that as to these binder and dispersant, one type alone or a combination of two types or more may be used in accordance with a purpose.

Next, the obtained plastic clay is formed into a desired shape, for example, a honeycomb shape or the like by an appropriate forming method. The forming can be performed by an extrusion forming method, an injection forming method, a pressing forming method, a method of forming a ceramic material into a columnar shape and thereafter forming through-holes or the like, and above all the extrusion forming method is preferably performed in that continuous forming is facilitated, cordierite crystals are oriented, and low thermal expansion can be obtained.

Next, a raw formed body can be dried by hot air drying, microwave drying, dielectric drying, decompression drying, vacuum drying, freezing drying, and above all, a drying step of combination of the hot air drying with the microwave drying or dielectric drying is preferably performed in that the whole body can be quickly and uniformly dried.

Finally, the dried formed body is preferably fired usually at a temperature of 1410 to 1440° C. for three to seven hours depending on the size of the dried formed body. The drying step and the firing step may be continuously performed. The cordierite porous body can be obtained through the above-described manufacturing process.

The present invention will be described more concretely hereinafter in accordance with examples, but the present invention is not limited to these examples.

EXAMPLES 1 TO 7, 11 TO 19

Inorganic micro balloons indicating values shown in Table 1 with respect to a total content of $SiO_2$ and $Al_2O_3$, a total content of $Na_2O$ and $K_2O$, a melting point, a crush strength, a tap density, and a moisture content at a raw material accepting time, the balloons were used as such in Examples 6, 15. In the other examples, after performing calcining shown in Table 1, talc and $Al_2O_3$ were fired, and blended at an amount ratio to form a cordierite composition, and a cordierite forming material was obtained. With respect to 100 parts by mass of the material, 2 parts by mass of each of methyl cellulose and hydroxypropoxyl methyl cellulose, 0.5 part by mass of a fatty acid soap which was a surfactant, and an appropriate amount of water were added to obtain a clay. The clay was kneaded, and extruded/formed to form a honeycomb structure, and moisture was removed by dielectric drying and hot air drying. Thereafter, firing was performed at a maximum temperature of 1420° C. on conditions that a maximum temperature retention time was eight hours, and a cordierite porous body of a honeycomb structure was obtained (Examples 1 to 7, 11 to 19).

It is to be noted that in Table 1, "the total content of $SiO_2$ and $Al_2O_3$" is a value measured by Agglomerated mass plus absorptiometry, and EDTA titration method in conformity to JIS M8853 (fire-resistant clay analysis method), and is a value corresponding to "a total content of Si and Al sources contained in the inorganic micro balloon at a time when the Si source is converted to $SiO_2$, and the Al source is converted to $Al_2O_3$". Moreover, "a total content of $Na_2O$ and $K_2O$" is a value measured by an atomic light absorption process in conformity to JIS M8853 (fire-resistant clay analysis method), and is a value corresponding to "a total content of sodium and potassium compounds included in the inorganic micro balloon at a time when the sodium compound is converted to $Na_2O$, and the potassium compound is converted to $K_2O$".

Furthermore, "the tap density" in Table 1 is a value measured in conformity to JIS R1628, and "the crush strength" is a value calculated by the following equation (1) where an outer diameter a (m), and a crush load P (N) of a measuring sample (inorganic micro balloon) are measured using a micro compression tester. It is to be noted that in the following equation (1), S denotes a crush strength (MPa), and π indicates a ratio of the circumference of a circle to its diameter.

(Equation 1)

$$S = \frac{2.8P}{\pi \times a^2} \times 10^{-6} \quad (1)$$

EXAMPLE 8

A cordierite porous body of a honeycomb structure was obtained by a method similar to that of each of Examples 1 to 7, 11 to 19 except that $Al(OH)_3$ was used instead of $Al_2O_3$ (Example 8).

EXAMPLES 9, 10, 20, 21

Cordierite porous bodies of honeycomb structures were obtained by a method similar to that of each of Examples 1 to 7, 11 to 19 described above except that kaolin was used instead of $Al_2O_3$ (Examples 9, 10, 20, 21).

Comparative Example 1

A cordierite porous body of a honeycomb structure was obtained by a method similar to that of each of Examples 1 to 7, 11 to 19 described above except that kaolin was used instead of the inorganic micro balloon (Comparative Example 1).

(Physical Property Value Evaluation)

The following physical property values were measured with respect to obtained cordierite porous bodies. Results are shown in Table 1.

[Open porosity]: measured in Archimedes method

[Average pore diameter]: measured by a mercury porosimeter

[Coefficient of thermal expansion]: measured by a differential type measuring method using quartz as a standard sample

[Gas transport coefficient]: calculated by the following measuring and calculating methods in consideration of compressibility of a gas based on a Darcy law. That is, a part of a partition wall was taken from each cordierite porous body of a honeycomb structure and polished in such a manner as to eliminate concave/convex portions, and a measurement sample having a flat-plate operation was prepared. After holding the flat-plate portion of this measurement sample 4 between opening end portions 2a, 3a of two cylindrical tubes 2, 3 each having an inner diameter of 20 mmφ via sealing materials 5 of a gas transport characteristic measuring apparatus 1 shown in FIG. 1 in such a manner that there was not any gas leakage and inner-diameter portion shapes of the respective cylindrical tubes 2, 3 holding the measurement sample therebetween were superimposed on opposite sides of the measurement sample 4, atmosphere (gas G) having flow rate controlled was transported from one cylindrical tube 2. At this time, pressures on upstream and downstream sides of the measurement sample 4 were measured, respectively, and a gas transport coefficient K (μm²) was calculated based on the following equation (1). It is to be noted that in FIG. 1, reference numerals 10 denote absolute manometers, reference numeral 11 denotes a flowmeter, and reference numeral 12 denotes a flow rate control valve. In the following equation (2), Q denotes a transported gas flow rate (m³/s) measured on the downstream side of the measurement sample, T denotes a thickness (m) of the flat-plate portion of the measurement sample, μ denotes a transported gas static viscosity coefficient (Pa·s), D denotes a diameter of a gas transport portion in the measurement sample, $P_1$ denotes a gas pressure (Pa) on the upstream side, $P_2$ denotes a gas pressure (Pa) on the downstream side, and π denotes a ratio of the circumference of a circle to its diameter.

(Equation 2)

$$K = \frac{\pi D^2 (P_1^2 - P_2^2)}{8\mu T Q P_2} \times 10^{12} \quad (2)$$

[Soot Trapping Efficiency]:

An exhaust gas in which soot was generated by a generator was passed through a filter having a size: inner diameter of 144 mmφ× length of 152 mm, a partition wall thickness: 300 μm, and cell number: 300 cells/square inch for a certain time (two minutes), the soot included in the exhaust gas after passed through the filter was captured by filter paper, and a mass ($W_1$) of the soot was measured. The exhaust gas in which the soot was generated was captured by the filter paper without being passed through the filter for the same time, and a mass ($W_2$) of the soot was measured. Subsequently, values of $W_1$, $W_2$ were substituted into the following equation (3) to obtain a soot trapping efficiency.

(Equation 3)

$$\text{Soot trapping efficiency (\%)} = \{(W_2 - W_1)/(W_2)\} \times 100 \quad (3)$$

TABLE 1

| | Inorganic micro balloon | | | | | | | | | | | | | | | |
|---|---|---|---|---|---|---|---|---|---|---|---|---|---|---|---|---|
| | Total content (mass %) of SiO₂ and Al₂O₃ | Total content (mass %) of Na₂O and K₂O | Melting point (° C.) | Crush strength (MPa) | Tap density (g/cm³) | Moisture content (mass %) at raw material accepting time | Calcining conditions before blending | Moisture content (mass %) before blending | Al source except inorganic micro balloon | Added amount (mass %) of inorganic micro balloon at blending time | Kaolin/ inorganic micro balloon added mass ratio (%) | Open porosity (%) | Average pore diameter (μm) | Coefficient of thermal coefficient (×10⁻⁶/° C.) | Gas transport coefficient (μm²) | Soot trapping efficiency (%) |
| Example 1 | 90 | 1 | 1500 | 12 | 0.36 | 0.8 | 300° C. × 1 h | 0.08 | Al₂O₃ | 39 | 0 | 52 | 15 | 1 | 2 | 95 |
| Example 2 | 95 | 2 | 1500 | 5 | 0.41 | 0.5 | 300° C. × 1 h | 0.08 | Al₂O₃ | 38 | 0 | 53 | 14 | 0.9 | 3 | 95 |
| Example 3 | 90 | 2 | 1400 | 8 | 0.41 | 0.3 | 300° C. × 1 h | 0.08 | Al₂O₃ | 39 | 0 | 50 | 15 | 1 | 2 | 95 |
| Example 4 | 98 | 0.5 | 1600 | 5 | 0.40 | 0.2 | 300° C. × 1 h | 0.08 | Al₂O₃ | 36 | 0 | 66 | 32 | 0.8 | 10 | 90 |
| Example 5 | 98 | 0.5 | 1650 | 1 | 0.40 | 0.2 | 300° C. × 1 h | 0.08 | Al₂O₃ | 36 | 0 | 65 | 31 | 0.8 | 9 | 90 |
| Example 6 | 98 | 0.5 | 1600 | 5 | 0.40 | 0.1 | 300° C. × 1 h | 0.10 | Al₂O₃ | 36 | 0 | 66 | 30 | 0.8 | 9 | 90 |
| Example 7 | 98 | 0.5 | 1600 | 5 | 0.50 | 0.2 | 300° C. × 1 h | 0.08 | Al₂O₃ | 36 | 0 | 54 | 32 | 0.8 | 10 | 90 |
| Example 8 | 98 | 0.5 | 1600 | 5 | 0.40 | 0.2 | 300° C. × 1 h | 0.08 | Al(OH)₃ | 36 | 0 | 67 | 21 | 0.3 | 5 | 95 |
| Example 9 | 98 | 0.5 | 1600 | 5 | 0.40 | 0.2 | 300° C. × 1 h | 0.08 | kaolin, Al₂O₃ | 31 | 20 | 64 | 28 | 0.5 | 8 | 95 |
| Example 10 | 98 | 0.5 | 1600 | 5 | 0.40 | 0.2 | 300° C. × 1 h | 0.08 | kaolin, Al₂O₃ | 25 | 52 | 52 | 22 | 0.3 | 3 | 95 |
| Example 11 | 89 | 1 | 1450 | 5 | 0.36 | 1.1 | 300° C. × 1 h | 0.08 | Al₂O₃ | 41 | 0 | 45 | 12 | 1.0 | 0.5 | 95 |
| Example 12 | 95 | 2.5 | 1450 | 5 | 0.41 | 0.5 | 300° C. × 1 h | 0.08 | Al₂O₃ | 38 | 0 | 45 | 11 | 0.9 | 0.5 | 95 |
| Example 13 | 90 | 2.5 | 1350 | 13 | 0.41 | 0.5 | 300° C. × 1 h | 0.08 | Al₂O₃ | 39 | 0 | 45 | 13 | 1.0 | 0.6 | 95 |
| Example 14 | 98 | 0.5 | 1600 | 0.5 | 0.43 | 0.2 | 300° C. × 1 h | 0.08 | Al₂O₃ | 36 | 0 | 45 | 23 | 0.8 | 1 | 98 |
| Example 15 | 98 | 0.5 | 1600 | 5 | 0.43 | 0.2 | No calcining | 0.20 | Al₂O₃ | 36 | 0 | 67 | 26 | 0.3 | 15 | 70 |
| Example 16 | 98 | 0.5 | 1600 | 5 | 0.40 | 0.2 | 250° C. × 12 h | 0.15 | Al₂O₃ | 36 | 0 | 67 | 26 | 0.3 | 15 | 81 |
| Example 17 | 98 | 0.1 | 1600 | 1 | 0.40 | 0.2 | 300° C. × 1 h | 0.08 | Al₂O₃ | 38 | 0 | 46 | 9 | 0.6 | 0.2 | 98 |
| Example 18 | 98 | 0.5 | 1700 | 5 | 0.40 | 0.2 | 300° C. × 1 h | 0.08 | Al₂O₃ | 38 | 0 | 44 | 9 | 0.6 | 0.3 | 98 |
| Example 19 | 98 | 0.5 | 1600 | 5 | 0.55 | 0.2 | 300° C. × 1 h | 0.08 | Al₂O₃ | 36 | 0 | 46 | 32 | 0.8 | 10 | 90 |
| Example 20 | 98 | 0.5 | 1600 | 5 | 0.40 | 0.2 | 300° C. × 1 h | 0.08 | kaolin, Al₂O₃ | 30 | 19 | 64 | 28 | 0.8 | 8 | 95 |
| Example 21 | 98 | 0.5 | 1600 | 5 | 0.40 | 0.2 | 300° C. × 1 h | 0.08 | kaolin, Al₂O₃ | 25 | 56 | 48 | 21 | 0.3 | 2 | 95 |
| Comparative example 1 | — | — | — | — | — | — | — | — | Al₂O₃ | 0 | — | 40 | 8 | 0.3 | 0.1 | 98 |

As apparent from results shown in Table 1, it has been found that cases (Examples 1 to 21) where an inorganic micro balloon containing $SiO_2$ and $Al_2O_3$ is used as a part of Al and Si sources included in a cordierite forming material can easily stand comparison with a case (Comparative Example 1) where this balloon is not used, in that a cordierite porous body having a sufficiently high open porosity can be manufactured. It has also been found that in a case (Example 1) where an inorganic micro balloon whose total content of $SiO_2$ and $Al_2O_3$ is 90% by mass or more is used, the open porosity can be set to be further high as compared with a case (Example 11) where the total content is less than 90% by mass. It has further been found that in cases (Examples 2, 3) where an inorganic micro balloon whose total content of $Na_2O$ and $K_2O$ is 0.2 to 2% by mass is used, the open porosity can be set to be further high as compared with cases (Examples 12, 13) where the content exceeds 2% by mass. It is to be noted that it has been found that in cases (Examples 3, 4) where an inorganic micro balloon having a melting point of 1400 to 1650° is used, the open porosity can be set to be further high as compared with a case (Example 13) where an inorganic micro balloon having a melting point lower than 1400° is used and as compared with a case (Example 18) where an inorganic micro balloon having a melting point exceeding 1650° is used. It has also been found that in a case (Example 5) where an inorganic micro balloon having a crush strength of 1 MPa or more is used, the open porosity can be set to be further high as compared with a case (Example 14) where an inorganic micro balloon having a strength less than 1 MPa is used.

It is to be noted that it has been found that any of $Al_2O_3$ (Examples 1 to 7, 9 to 21), $Al(OH)_3$ (Example 8), and kaolin (Examples 9, 10, 20, 21) can be used as the Al source other than the inorganic micro balloon. It is to be noted that it-has been found that in a case (Example 8) where aluminum hydroxide $(Al(OH)_3)$ is used, the coefficient of thermal expansion can be set to be lower as compared with a case (Example 4) where aluminum hydroxide $(Al(OH)_3)$ is not used.

Moreover, it has been found that in a case (Example 6) where an inorganic micro balloon having a moisture content of 0.1% by mass or less is used and a case (Example 4) where an inorganic micro balloon obtained by the calcining at 300° C. or more is used, cordierite porous bodies having high soot trapping efficiencies can be manufactured as compared with a case (Example 14) where an inorganic micro balloon having a moisture content exceeding 0.1% by mass is used and a case (Example 16) where an inorganic micro balloon obtained by the calcining at less than 300° C. is used.

Furthermore, it has been found that in a case (Example 7) wherein an inorganic micro balloon having a tap density of 0.5 g/cm³ or less is used, a cordierite porous body having a higher open porosity can be manufactured as compared with a case (Example 19) where an inorganic micro balloon exceeding 0.5 g/cm³ is used, and in cases (Examples 9, 10) where 20 to 52% by mass of kaolin with respect to an amount of the inorganic micro balloon is used, cordierite porous bodies having lower coefficients of thermal expansion can be manufactured as compared with cases (Examples 20, 21) where kaolin out of the above-described ratio is used.

Moreover, it has been found that concerning a gas transport coefficient, as to the cordierite porous body prepared in any of the examples, a value of the gas transport coefficient is larger than that of the cordierite porous body prepared in Comparative Example 1.

From the above-described results, it is expected that the honeycomb structure prepared in the present embodiment can achieve a low pressure loss/high trapping efficiency, when used as a material constituting a filter, a catalyst carrier or the like for purifying an automobile exhaust gas.

INDUSTRIAL APPLICABILITY

As described above, in a method of manufacturing a cordierite porous body of the present invention, an inorganic micro balloon containing $SiO_2$ and $Al_2O_3$ is used as a part or all of Al and Si sources included in a cordierite forming material, therefore the method has an advantage that there is a remarkably low possibility of generation of defects such as cuts causing a leakage of a fluid in the obtained cordierite porous body, and a high-porosity cordierite porous body having characteristics preferable for a material constituting a filter, a catalyst carrier or the like mainly for purifying an automobile exhaust gas can be manufactured.

The invention claimed is:

1. A method of manufacturing a cordierite porous body comprising providing cordierite forming materials comprising an Al source, an Si source, and an Mg source, and firing the materials to form cordierite, wherein the Al source and the Si source are at least partially provided by inorganic micro balloons containing at least 90% by mass $Al_2O_3$ and $SiO_2$, wherein a moisture content of the inorganic micro balloons is less than or equal to 0.1% by mass.

2. The method of manufacturing a cordierite porous body according to claim 1, wherein a crush strength of the inorganic micro balloons, measured by a micro compression tester, is 1 MPa or more.

3. The method of manufacturing a cordierite porous body according to claim 1, wherein a moisture content of the inorganic micro balloons is 0.08% by mass or less.

4. The method of manufacturing a cordierite porous body according to claim 1, wherein the inorganic micro balloons are obtained by calcining at 300° C. or more.

5. The method of manufacturing a cordierite porous body according to claim 1, wherein a content of a sodium compound and a potassium compound included in the inorganic micro balloons is 0.2 to 2% by mass, when the sodium compound is converted to $Na_2O$, and the potassium compound is converted to $K_2O$.

6. The method of manufacturing a cordierite porous body according to claim 1, wherein a melting point of the inorganic micro balloons is 1400 to 1650° C.

7. The method of manufacturing the cordierite porous body according to claim 1, wherein a tap density of the inorganic micro balloons is 0.5 g/cm³ or less.

8. The method of manufacturing the cordierite porous body according to claim 1, wherein talc is used as a part or all of the Mg source.

9. The method of manufacturing the cordierite porous body according to claim 1, wherein the Al source further comprises aluminum hydroxide $(Al(OH)_3)$.

10. The method of manufacturing the cordierite porous body according to claim 1, wherein the Al source further comprises 20 to 52% by mass of kaolin with respect to an amount of the inorganic micro balloons.

* * * * *